United States Patent
Sarto

[15] 3,677,240
[45] July 18, 1972

[54] CRANKCASE VENTILATION

[72] Inventor: Jorma O. Sarto, Orchard Lake, Mich.

[73] Assignee: Chrysler Corporation, Highland Park, Mich.

[22] Filed: Nov. 18, 1970

[21] Appl. No.: 90,591

[52] U.S. Cl. ............................. 123/119 B, 123/41.86
[51] Int. Cl. .............................................. F02f 9/00
[58] Field of Search ........................ 123/119 B, 41.86

[56] References Cited

UNITED STATES PATENTS

| | | | |
|---|---|---|---|
| 3,500,806 | 3/1970 | Sarto et al. | 123/119 B |
| 1,507,950 | 9/1924 | Blizzard | 123/119 B |
| 3,272,192 | 9/1966 | Jensen et al. | 123/119 B |
| 3,363,613 | 1/1968 | Price | 123/119 B |
| 3,463,132 | 8/1969 | Krieck | 123/119 B |
| 3,209,738 | 3/1964 | Powers | 123/119 B |
| 3,381,673 | 5/1968 | Drysdale | 123/119 B |
| 3,237,617 | 3/1966 | Daigh | 123/119 B |
| 2,818,052 | 12/1957 | Trainer | 123/119 B |
| 3,166,061 | 1/1965 | Weiser | 123/119 B |

Primary Examiner—Wendell E. Burns
Assistant Examiner—Ronald H. Lazarus
Attorney—Talburtt and Baldwin

[57] ABSTRACT

An aspirator is included in a crankcase ventilator conduit extending between the crankcase and carburetor air cleaner for drawing air into the conduit when vapors flow therethrough from the crankcase thereby diluting them.

4 Claims, 1 Drawing Figure

Patented July 18, 1972
3,677,240
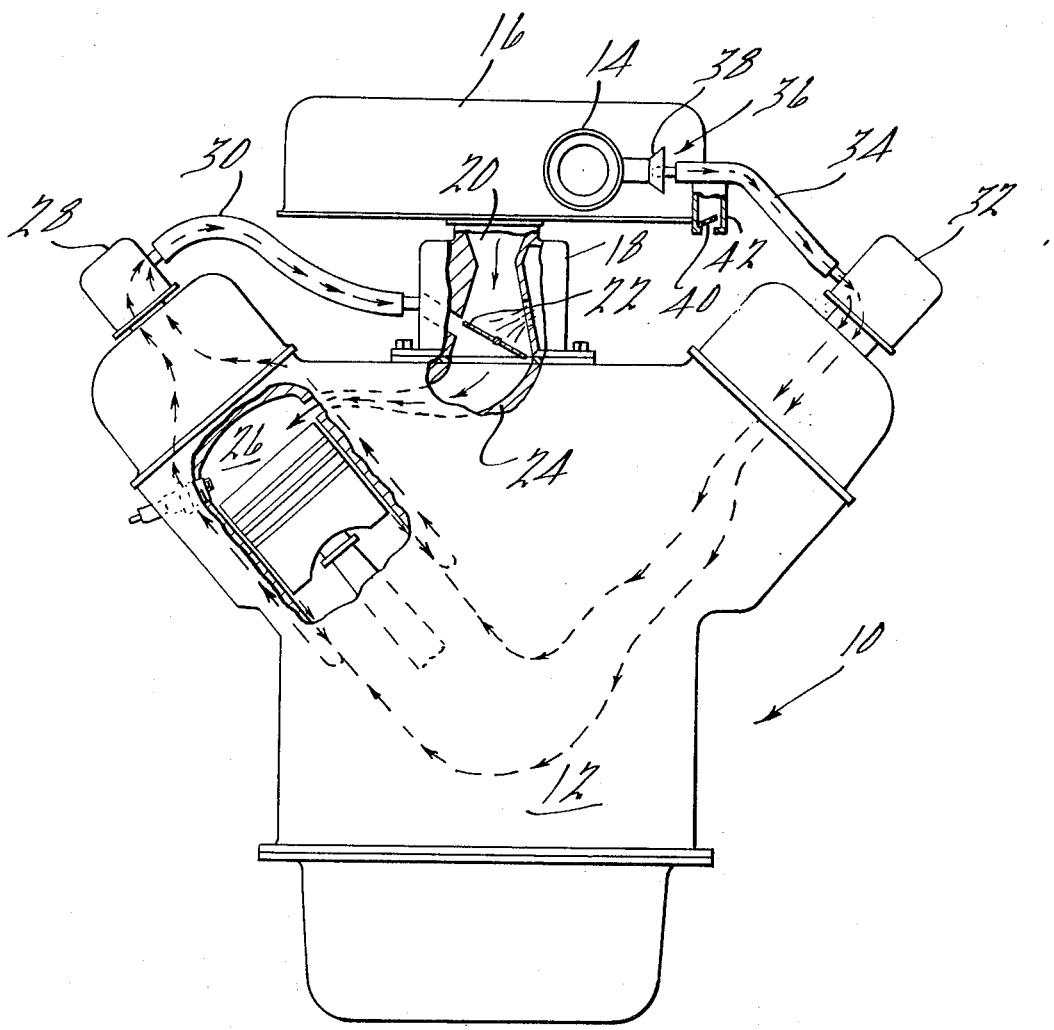
INVENTOR.
Jorma O. Sarto
BY
Talburtt & Baldwin
ATTORNEYS.

CRANKCASE VENTILATION

BACKGROUND

Closed crankcase ventilation systems have been used on many automobiles for several years. Such a system is described in detail in SAE Paper No. 100,150 entitled "Chrysler Evaporation Control System, the The Vapor Saver For 1970," by J. O. Sarto, W. S. Fagley and W. A. Hunter and in SAE Paper No. 700,151 entitled "The Chrysler Cleaner Air System For 1970," by R. E. Goodwillie, N. M. Jacob and E. W. Beckman. In such a system the inlet and outlet ventilation passages or conduits to the crankcase are connected to the engine induction system. The inlet ventilator conduit extends between the carburetor air cleaner, which represents an upstream portion of the induction system, and an inlet passage into the crankcase, such as the crankcase air cleaner. The outlet ventilator conduit extends between another crankcase passage and the inlet manifold, that is a downstream portion of the induction system. Under engine operating conditions of light load, air from the air cleaner passes through the inlet ventilator conduit into the crankcase and sweeps blow-by vapors collected therein through the outlet ventilator conduit and into the inlet manifold. However, during certain operating conditions, such as heavy acceleration or wide open throttle (WOT), the flow in the inlet ventilator conduit is reversed and blow-by vapors from the crankcase flow through the inlet ventilator conduit to the carburetor air cleaner and into the induction system as well as through the outlet ventilator conduit. This flow reversal also occurs during engine start-up and has created a problem known as sometimes "hot start die out."

A hot start is usually observed after a vehicle "hot soaks" for 20 minutes after a 10 mile run at highway speeds. The exact speed used may vary with location conditions. The "hot soak" is most severe when it is conducted in a wind-free atmosphere with radiant heat loading from the road surface and from the sun. A similar condition may be observed in the mountains at altitudes with lower ambient temperature due to the effect of the reduced atmospheric pressure on the evaporation characteristics of the fuel.

As a result of "hot start die out" studies, it has been determined that the volume of "blow-by" at first fire during starting of the engine is greater than the engine working volume. This temporary condition which occurs during engine run-up is shown in the blow-by ratios in Table 1. Since this demonstrated the delivery of stored vapor to the engine during the start-up period through both the inlet and outlet ventilator passages, it could be seen that the large volume of fuel-rich blow-by vapors being dumped into the carburetor air cleaner were at least in part responsible for hot start die out problems.

TABLE 1

Engine Blowby-Displacement Ratios During Starting 383 cu in.—WOT Blowby = 3.6 cfm = 6221 cu in./minute

| RPM | Displacement | Blowby/displacement |
| --- | --- | --- |
| 1 383/2 = 192 | | 6221/192 = 32.4 |
| 10 | 1,920 | 3.24 |
| 30 | 5,760 | 1.08 |
| 60 | 11,520 | 0.50 |
| 100 | 19,200 | 0.32 |
| 600 | 115,200 | 0.05 |

SUMMARY

This invention provides Bernoulli aspirator means in the inlet ventilator conduit which permits the normal flow of fresh air therethrough and into the crankcase. However, when flow reversal occurs and fuel-rich vapors flow therethrough to the carburetor air cleaner, fresh air is aspirated into the conduit to dilute the vapors and provide a less rich mixture to the engine. The dilution of these blow-by vapors ventilated from the crankcase during start-up has been found to decrease "hot start die out."

BRIEF DESCRIPTION OF THE DRAWING

The FIGURE is a schematic drawing of an engine ventilator system including inlet and outlet ventilator conduits to the crankcase from different parts of the engine induction system; an aspirator means is included in the inlet ventilator conduit.

DESCRIPTION OF THE PREFERRED EMBODIMENT

The FIGURE shows a closed engine ventilation system and the ventilator flow therethrough, as indicated by the arrows, at light loads such as at idle. Engine 10 includes crankcase 12 and an engine induction system which may consist of a carburetor air cleaner snorkel 14 having a fresh air inlet and passage communicating with carburetor air cleaner 16, a carburetor 18 including an upper induction conduit 20 communicating with air cleaner 16 and a throttle valve 22 and finally an inlet manifold means 24, which communicates with a combustion chamber 26. The system also includes ventilator outlet means which may consist of a crankcase ventilator valve 28 and a first crankcase ventilator conduit 30 which extends between valve 28 and inlet manifold 24 via the carburetor induction conduit. The ventilator inlet means for the system consists of a crankcase inlet means such as crankcase air cleaner 32 which communicates with the engine crankcase. Connected between snorkel 14 and air cleaner 32 is a second crankcase ventilator conduit or back-up conduit 34, which functions at light loads and idle as a ventilator inlet conduit to the crankcase.

The terminal end of back-up conduit 34 may be simply connected to snorkel 14 as shown. However, for the purposes of this invention it may be connected to any portion of the air cleaner which is "upstream" of the air cleaner filter, sometimes referred to as the "dirty side" of the air cleaner. Included in conduit 34 is an aspirator means, generally indicated at 36 of the Bernoulli type which basically consists of an opening in the conduit intermediate the ends thereof. The opening may simply be a hole in the conduit or a complete break therein as shown. According to the Bernoulli principle, the flow of a fluid through conduit 34 causes a decrease in pressure in the vicinity of the aspirator opening in the conduit which, being lower than atmospheric, allows air surrounding the opening to flow into the conduit. If desired, one may facilitate the inward flow by the addition of a funnel shaped annulus such as is shown at 38. However this is not necessary. The arrangement causes dilution of the vapors by the fresh air thus decreasing the richness of the mixture which flows through the air cleaner and into the engine induction system.

As indicated hereinabove, and as shown in the Figure, at light engine loads such as at idle, fresh air flows from the snorkel through back-up conduit 34 into crankcase 12 picking up blow-by vapors and exits through valve 28 and crankcase ventilator conduit 30 to be directed to the combustion chamber via inlet manifold 24. A check valve 40 may be connected to back-up conduit 34 by appropriate means such as 42 to supply additional air to the crankcase if the demand for ventilating air is greater than aspirator 36 can provide. The valve is preferably the normally closed type. During this operating phase, aspirator 36 will function to introduce additional fresh air to the conduit but this is incidental to this part of the operational phase. It is, however, important to note that the aspirator does not interfere with the flow in this direction and may in fact aid it to a certain extent. However, at heavy loads such as wide open throttle, starting or heavy acceleration, the direction of flow in back-up conduit 34 reverses and blow-by vapors and other crankcase vapors flow out of both the crankcase ventilator conduit 30 and back-up conduit 34 into the engine induction system. With aspirator means 36 in the conduit, when the flow reverses, the vapors are diluted by the introduction of fresh air into the conduit as previously described and the hot start die out problem has been found to be greatly ameliorated.

The embodiments of the invention in which an exclusive property right is claimed or defined are as follows:

1. In an emission control system for internal combustion engines having an engine intake manifold and a carburetor air cleaner, wherein the crankcase serves to collect fuel vapors and blow-by vapors which are subsequently transferred to the engine intake manifold by means of a crankcase ventilator conduit connected between the crankcase and the intake manifold and a back-up conduit connected between the crankcase and the carburetor air cleaner, the improvement comprising the addition of Bernoulli aspirator means in the back-up conduit whereby air is aspirated into the conduit when vapors from the crankcase flow therethrough and the dilution of the vapors by the air is accomplished before the vapors enter the carburetor air cleaner.

2. The system according to claim 1 wherein the aspirator means comprises an opening in the back-up conduit intermediate the ends thereof.

3. The system according to claim 1 wherein the aspirator means comprises a complete break in the back-up conduit.

4. The system according to claim 1 including check valve means in the back-up conduit for admitting air thereto when the flow in the conduit is directed to the crankcase, the check valve means being located between the aspirator means and the crankcase.

* * * * *